April 21, 1964     H. F. W. MARUHN     3,129,973
ELASTIC MOUNTING OF DRIVER'S CAB OF TRUCK
Filed Nov. 1, 1961

INVENTOR
HERBERT F. W. MARUHN

BY Dicks and Craig
ATTORNEYS 3,129,973
ELASTIC MOUNTING OF DRIVER'S CAB
OF TRUCK
Herbert F. W. Maruhn, Stuttgart-Uhlbach, Germany, assignor to Daimler-Benz Aktiengesellschaft, Stuttgart-Unterturkheim, Germany
Filed Nov. 1, 1961, Ser. No. 149,252
Claims priority, application Germany Nov. 5, 1960
2 Claims. (Cl. 296—35)

The present invention relates to an elastic mounting of a driver's cab on the chassis frame of a truck or of a tractor of a semi-trailer unit.

In previous driver's cabs which were elastically mounted on the frame by means of silent blocks of rubber, it has been found that vibrations which are caused by the chassis of the truck or tractor are transmitted to the cab and swing the cab back and forth about an axis which extends transverse to the vehicle and underneath the cab. This results in impacts which are transmitted from the back rest of the cab seats to the persons sitting in the cab and which are very disagreeable and tiring to these persons especially on long trips. Such impacts occur especially in the cabs of the tractors of semi-trailer units.

It is an object of the present invention to provide an elastic mounting of a driver's cab which also reduces the mentioned vibrations and impacts of and upon the cab. According to the invention this object is attained essentially by mounting the cab on a multilayer leaf spring which preferably extends transverse to the longitudinal axis of the chassis frame and the outer ends and the central part of which act upon the frame and the cab, respectively.

By mounting the cab in this manner, it is possible with relatively simple and inexpensive means to suppress the vibrations which are transmitted from the chassis through the elastic mounting to the cab, and to separate the frequency of the natural vibrations of the frame so that the cab will be much less affected by the vibrations of the chassis.

These as well as further objects, features, and advantages of the present invention will become more clearly apparent from the following detailed description thereof, particularly when the same is read with reference to the accompanying diagrammatic drawings, in which—

FIGURE 8 shows an enlarged top plan view of a mounting according to FIGURE 1; while

Figure 1:
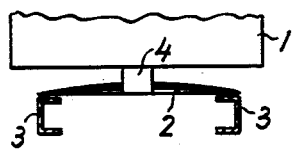
FIGURE 1 shows a two-point mounting of a cab according to the invention.

In the drawings, FIGURE 1 indicates a driver's cab 1 of a truck or semi-trailer tractor which is mounted either at the front or rear thereof on a multilayer leaf spring 2 which extends transverse to the longitudinal direction of the vehicle. The outer ends of leaf spring 2 rest upon the side members 3 of the frame, while the central part thereof acts through a connecting member 4 upon cab 1. One end of leaf spring 2 is preferably pivotally connected to one side member of the chassis frame so as to be pivotable about an axis extending in the longitudinal direction of the vehicle, while the other end of the leaf spring rests on the other side member of the frame so as to be slidable thereon. This other end of the spring is, however, prevented by suitable means from being lifted off the frame member. By the arrangement according to FIGURE 1, a two-point support of the cab is attained in the transverse plane as illustrated. If the central part of leaf spring 2 is connected to the cab by means of a pivot bearing 5, as shown in FIGURE 2, it is also possible to support the cab at only one point.

Figure 3:
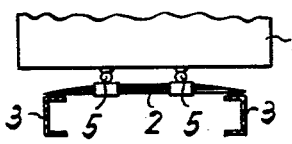
FIGURE 3 shows a modification of a two-point mounting of the cab.

FIGURE 3 illustrates another two-point mounting of the cab, in which the leaf spring 2 rests on the frame side members 3 in the same manner as illustrated in FIGURE 1, while its connection to the driver's cab 1 is attained by two pivot bearings 5 which are spaced from each other. In this embodiment of the invention, the resilience of the mounting at vertical movements of cab 1 is softer relative to the frame than at tilting movements of the cab.

Figure 2:
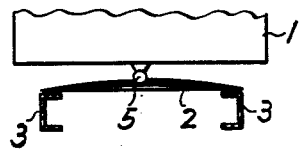
FIGURE 2 shows a one-point mounting of a cab.
Figure 4:
FIGURE 4 shows a further modification of the two-point mounting.

FIGURE 4 shows another modification of a two-point mounting of the cab, in which the position of leaf spring 2 is reversed as against the embodiments according to FIGURES 1 to 3 so that the cab is supported on the two ends of the leaf spring, while the central part of the spring is rigidly connected by a connecting member 4 to the cross member 6 which connects the longitudinal frame members 3.

Figure 5:
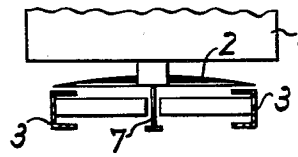
FIGURE 5 shows an elastic mounting similar to that according to FIGURE 1, but provided with means for limiting the elastic movement of the cab in a vertical direction.

In order to take up forces of inertia which occur when the brakes are applied or which are due to impacts at accidents and have the tendency to move the cab in the upward direction relative to the frame, suitable means 7 may be applied, as indicated in FIGURE 5, to restrict such upward movement. These means may be either of a rigid or resilient construction.

Figure 6:
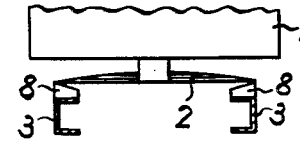
FIGURE 6 shows a progressive spring mounting.
Figure 7:
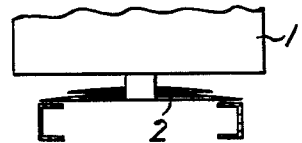
FIGURE 7 shows a modification of the progressive spring mounting according to FIGURE 6.

If it is desired to attain a mounting with a progressively increasing spring force, the outer ends of leaf spring 2 may according to FIGURE 6 rest on bearing blocks 8 which are inwardly inclined and secured to the frame side members 3. A similar effect will be attained by the mounting according to FIGURE 7 in which the outer ends of each leaf of spring 2 are vertically spaced from the next spring leaf.

Figure 8:
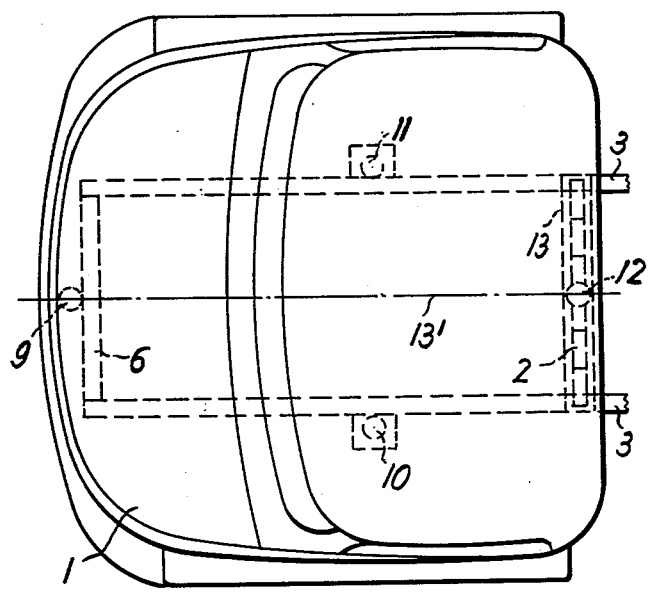
Figure 9:
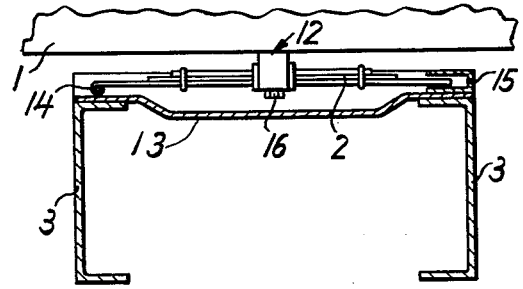
FIGURE 9 shows a rear view of the mounting according to FIGURE 8.

FIGURES 8 and 9 show a two-point mounting according to FIGURE 1 but on a larger scale, as seen in a plan view upon the cab and in a rear view, respectively. The driver's cab 1 of a truck or semi-trailer tractor is elastically mounted on the side members 3 of the chassis frame and on the cross members 6 which connect the side members by means of four bearings 9, 10, 11, and 12. Bearing 9 is provided in the form of a silent block and disposed within the central vertical plane 13′ of the cab near the front end thereof, and it supports the cab on the front cross member 6 of the frame. Bearings 10 and 11 also form silent blocks and support the cab within a transverse plane which is located approximately at the center between the front and rear ends of the cab. These two bearings 10 and 11 brace the cab on the side members 3 of the frame. Bearing 12 which forms a two-point mounting according to FIGURE 1 is mounted near the rear end of the cab.

As illustrated in greater detail in FIGURE 9, bearing 12 comprises the multilayer leaf spring 2 which is placed within a U-shaped rail 13 which is open at its upper side and connects the side members 3 of the frame. One end of leaf spring 2 is secured by a bolt 14 to rail 13, while the other end of the spring rests loosely on the lower web of a member 15 which is inserted into rail 13 and is secured against being lifted by the upper web of member 15. Cab 1 is rigidly secured to leaf spring 2 at the center between its two ends by a bolt 16. The means as indicated at 7 in FIGURE 5 for restricting the upward movements of the cab which occur as the result of forces of inertia are not illustrated in FIGURE 9.

The arrangement of leaf spring 2 insures an elastic mounting similar to that as attained by a silent block, and in addition, due to its internal friction, it suppresses very effectively the vibrations which are transmitted to the cab from the chassis frame.

Instead of providing the rear bearing 12 with a leaf spring 2, it is also possible to provide the front bearing 9 with such a spring without diminishing the effect of the mounting.

If the truck or tractor is to be provided with a tiltable driver's cab, it is advisable to provide a connection between the cab and the leaf spring which permits the cab to be quickly severed from and reconnected to the leaf spring. Furthermore, the leaf spring may be provided with suitable noise-preventing means. For example, the ends of the leaf spring may be mounted in rubber, and it is also possible to provide inserts of bronze or plastic between the leaves of the spring. This has the advantage that a certain friction will be attained which is not dependent upon the greasing of the spring. In order to prevent the headlights of the cab from following its resilient movements, suitable automatic or manual adjusting means may be provided for the headlights which maintain them in the proper position regardless of the flexing of the leaf spring. Obviously, the headlights may also be mounted on the bumper of the truck which is secured to the frame so that any movements of the cab will not affect the headlight adjustment. Since the center of oscillation of the cab relative to the chassis frame lies underneath the frame, the silent blocks may also be mounted in such a manner at one end of the cab opposite to the end which is supported by the leaf spring on the frame that the supporting surfaces of the silent blocks extend substantially parallel to the line of connection between the center of oscillation and the points on which the cab is mounted.

Although the invention has been illustrated and described with reference to the preferred embodiments thereof, it may be understood that it is in no way limited to the details of such embodiments, but is capable of numerous modifications within the scope of the appended claims.

What is claimed is:

1. In a truck or tractor having a frame and a driver's cab defined by the radiator grill and a rear wall, the improvement consisting essentially of an elastic mounting means for supporting said cab on said frame comprising a pair of resilient bearings supporting said cab on said frame approximately midway between said grill and said rear wall, said frame including a pair of bearer members extending longitudinally of said truck and a substantially U-shaped rail extending transverse to the longitudinal axis of said frame and connecting said longitudinal bearer members, said rail being arranged adjacent said rear wall, and spring means arranged adjacent said rear wall and including a leaf spring extending transverse to the longitudinal axis of said frame and disposed within said U-shaped rail, said leaf spring consisting of a plurality of flat superimposed spring leaves of increasing length, one outer end of the spring leaf of greatest length being fixed on said frame and the other end thereof being mounted on said frame so as to be slidable in the longitudinal direction of said spring, means for securing said slidable end so as not to be lifted off said frame, and means for rigidly securing said cab to the central part of said spring.

2. In a truck or tractor having a frame and a driver's cab defined by the radiator grill and a rear wall, the improvement consisting essentially of an elastic mounting means for supporting said cab on said frame, comprising a pair of resilient bearings supporting said cab on said frame approximately midway between said grill and said rear wall, said frame including a pair of bearer members extending longitudinally of said truck and a substantially U-shaped rail extending transverse to the longitudinal axis of said frame and connecting said longitudinal bearer members, said rail being arranged adjacent said rear wall, and spring means arranged adjacent said rear wall and including a leaf spring extending transverse to the longitudinal axis of said frame and disposed within said U-shaped rail, one outer end of said spring being fixed on said frame and the other end being mounted on said frame so as to be slidable in the longitudinal direction of said spring, means for securing said slidable end so as not to be lifted off said frame, and means for rigidly securing said cab to the central part of said spring.

References Cited in the file of this patent

UNITED STATES PATENTS

| | | |
|---|---|---|
| 2,882,090 | Sewelin | Apr. 14, 1959 |
| 2,885,243 | Feil | May 5, 1959 |
| 2,901,284 | Page | Aug. 25, 1959 |
| 3,010,757 | DeHaan | Nov. 28, 1961 |

FOREIGN PATENTS

| | | |
|---|---|---|
| 1,109,539 | Germany | June 22, 1961 |